G. C. TUCKER.
PROPELLING ATTACHMENT FOR GARDEN IMPLEMENTS OR THE LIKE.
APPLICATION FILED FEB. 18, 1918.
1,278,399.
Patented Sept. 10, 1918.
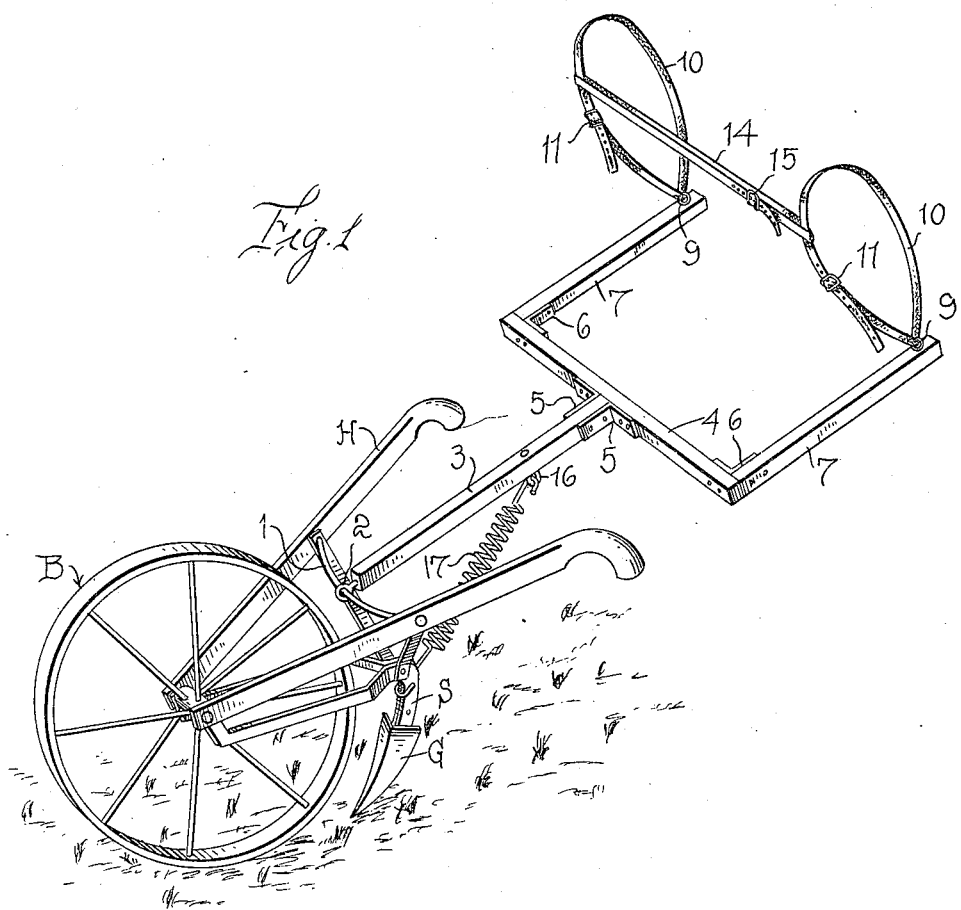
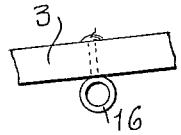
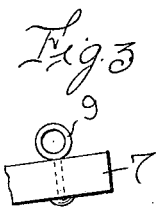
Inventor
Grover C. Tucker
By Watson E. Coleman
Attorney

UNITED STATES PATENT OFFICE.

GROVER CLEVELAND TUCKER, OF TUSCALOOSA, ALABAMA.

PROPELLING ATTACHMENT FOR GARDEN IMPLEMENTS OR THE LIKE.

1,278,399.

Specification of Letters Patent. Patented Sept. 10, 1918.

Application filed February 18, 1918. Serial No. 217,843.

*To all whom it may concern:*

Be it known that I, GROVER CLEVELAND TUCKER, a citizen of the United States, residing at Tuscaloosa, in the county of Tuscaloosa and State of Alabama, have invented certain new and useful Improvements in Propelling Attachments for Garden Implements or the like, of which the following is a specification, reference being had to the accompanying drawings.

This invention relates to certain improvements in propelling attachments for garden implements or the like and it is an object of the invention to provide a device of this general character having novel and improved means whereby a portable body such as a garden plow, wheel barrow, lawn mower or the like may be readily pushed by a person with convenience and facility and with a minimum of physical effort.

It is also an object of the invention to provide an attachment of this general character having novel and improved means whereby the strain of the attachment during a working operation is disposed downwardly upon the shoulders of the operator and wherein the attachment is so arranged as to permit the body to be readily guided by the hands of the operator.

Another object of the invention is to provide an attachment of this general character having novel and improved means whereby the attachment may be readily applied to or removed from the body with which it coacts and whereby the attachment may be readily adjusted to the desired angle to the operator.

Furthermore, it is an object of the invention to provide an attachment of this general character wherein loops are provided for operative engagement with the shoulders of the operator together with novel and improved means for creating sufficient tension to maintain the loops in proper position at all times during a working operation.

The invention consists in the details of construction and in the combination and arrangement of the several parts of my improved propelling attachment for garden implements or the like whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective illustrating a propelling attachment constructed in accordance with an embodiment of my invention and in applied position;

Fig. 2 is a fragmentary view in side elevation of the push bar as herein included; and Fig. 3 is a fragmentary view in side elevation of the outer end portions of one of the arms carried by the cross member as herein disclosed.

While my invention is adapted for use with a portable body of any type, it is generally employed in connection with garden work or the like, garden plows, lawn mowers, wheel-barrows or other devices, I herein describe and illustrate my invention as particularly applied to a garden plow although, I do not wish to be understood as limiting myself to this particular use.

As disclosed in the accompanying drawings B denotes a garden plow of a conventional type and which includes the rearwardly directed handles H and the depending shank S and to which the ground working element G is engaged. The lower portions of the handles H are connected by the forwardly curved bar 1 which is also loosely directed through the eye member 2 carried by the lower end of the push bar 3. The push bar 3 is of a predetermined length and terminates at a point rearwardly of the handles H. Secured to the rear end of the bar 3 is the cross member 4 extending beyond opposite sides of said bar 3 and held thereto in the present embodiment of my invention through the medium of the brackets 5. Secured to the opposite ends of the cross member 4 through the medium of the brackets 6 are the rearwardly directed arms 7 preferably arranged in parallelism and which are of such length as to extend beyond the arm-pits of the operator and terminate rearwardly of the person. The rear or free end portions of the arms 7 are provided with the upstanding eye members 9 with which are engaged the flexible loops 10. The loops 10 are capable of enlargement or contraction through the medium of the buckles 11 or the like. The loops 10 are adapted to be disposed around and over the shoulders of the operator or person and as the arms 7 extend rearwardly of the operator it will be at once self-evident that the strain of the pushing operation will be imposed downward upon the shoulder. This in actual practice has fully established the fact that a maximum amount of labor may be performed with a minimum of fatigue. It is also to be noted that through the medium of the loops 10 the attachment may be readily applied to or disengaged from the body of the operator as it is only necessary to insert or withdraw the arms through the loops 10. I also find it of advantage to connect the loops 10 by the flexible member 14 which is adapted to extend across the breast and said member is capable of adjustment through the medium of the buckle 15 or the like in order to meet the various requirements of practice.

Depending from the upper portion of the bar 3 is the eye member 16 to which is secured an end portion of a retractile member 17 herein disclosed as a conventional coil spring and the opposite end portion of the retractile member is provided with a hook adapted for detachable engagement with the lower portion of the shank S as herein disclosed or with the lower portion of any other type of portable body or implement with which my improved attachment may be employed. The retractile member 17 serves to constantly urge the outer end portion of the bar 3 downwardly which results in the loop members 10 having proper contact with the shoulders of the operator so that the pressure incident to weight and the pushing force is imposed at all times upon the top of the shoulders of the operator. Though the medium of the curved rod 1 and the sliding connection therewith of the bar 3 as afforded by the eye member 2, the required relative movement of the implement or body and the attachment is permitted to compensate for the various positions assumed by either or both.

From the foregoing description, it is thought to be obvious that a propelling attachment for garden implements or the like constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a portable body, a propelling attachment consisting of a push bar adapted for detachable engagement with the body, a cross member carried by the opposite end portion of the bar, rearwardly directed arms carried by the extremities of the cross member and adapted to extend rearwardly of a person below the arm-pits, flexible loop members engaged with the extremities of the arm and adapted to be disposed over the shoulders of a person, and means coacting with the push bar and portable body for constantly urging the outer end portion of the push bar downwardly.

2. In combination with a portable body, a propelling attachment consisting of a push bar adapted for detachable engagement with the body, a cross member carried by the opposite end portion of the bar, rearwardly directed arms carried by the extremities of the cross member and adapted to extend rearwardly of a person below the arm-pits, flexible loop members engaged with the extremities of the arm and adapted to be disposed over the shoulders of a person, means coacting with the push bar and portable body for constantly urging the outer end portion of the push bar downwardly, and a breast strap connecting the flexible loop members.

3. In combination with a portable body provided with a forwardly curved rod, a propelling attachment including a push bar provided with an eye member at one end through which the curved end of the portable body is directed, loop members carried by the opposite end portions of the push bar and adapted to be disposed over the shoulders of a person, and means coacting with the push bar and with the portable body at a point below the curved rod for constantly urging the outer end of the push bar downwardly.

In testimony whereof I hereunto affix my signature in the presence of two witnesses.

GROVER CLEVELAND TUCKER.

Witnesses:
HARDY CLEMENT,
E. M. BOWNS.